United States Patent [19] [11] Patent Number: 4,930,375
Yamamoto et al. [45] Date of Patent: Jun. 5, 1990

[54] HYDRAULIC CONTROL SYSTEM FOR AUTOMATIC TRANSMISSION

[75] Inventors: Koichi Yamamoto; Takahiro Kyohzuka, both of Hiroshima, Japan

[73] Assignee: Mazda Motor Corporation, Hiroshima, Japan

[21] Appl. No.: 291,271

[22] Filed: Dec. 28, 1988

[30] Foreign Application Priority Data

Dec. 28, 1987 [JP] Japan .................................. 62-332189
Jan. 19, 1988 [JP] Japan .................................. 63-9004

[51] Int. Cl.⁵ ............................................. B60K 41/18
[52] U.S. Cl. ...................................................... 74/866
[58] Field of Search .......................................... 74/866

[56] References Cited

U.S. PATENT DOCUMENTS

| | | | |
|---|---|---|---|
| 3,605,507 | 9/1971 | Ishihara et al. | 74/761 |
| 4,354,236 | 10/1982 | Miki et al. | 74/866 X |
| 4,367,528 | 1/1983 | Kawamoto et al. | 74/866 |
| 4,519,273 | 5/1985 | Shimizu et al. | 74/866 X |
| 4,653,350 | 3/1987 | Downs et al. | 74/866 X |
| 4,665,774 | 5/1987 | Oguri | 74/868 |
| 4,685,356 | 8/1987 | Iwatsuki | 74/866 |
| 4,707,789 | 11/1987 | Downs et al. | 74/866 X |
| 4,787,258 | 11/1988 | Yamamoto et al. | 74/866 |

FOREIGN PATENT DOCUMENTS 3506325 2/1985 Fed. Rep. of Germany .

Primary Examiner—Dirk Wright
Attorney, Agent, or Firm—Fleit, Jacobson, Cohn, Price, Holman & Stern

[57] ABSTRACT

A hydraulic control system comprising frictional device provided with pistons and a pair of frictional members controlled to be moved between an engaged position in which the frictional members are frictionally engaged with each other and a disengaged position in which the frictional members are disengaged from each other by a hydraulic pressure so as to switch a power transmitting path in the automatic transmission for accomplishing a gear shift operation among the plurality of the shift gear stages, a hydraulic supply means for applying the hydraulic pressure to the piston. A restriction control is carried out in a manner that an increase of the hydraulic pressure is restricted by a predetermined period at an initial stage of the gear shift operation wherein the frictional members are being moved to the engaged position and producing an initial engaging force therebetween.

15 Claims, 5 Drawing Sheets

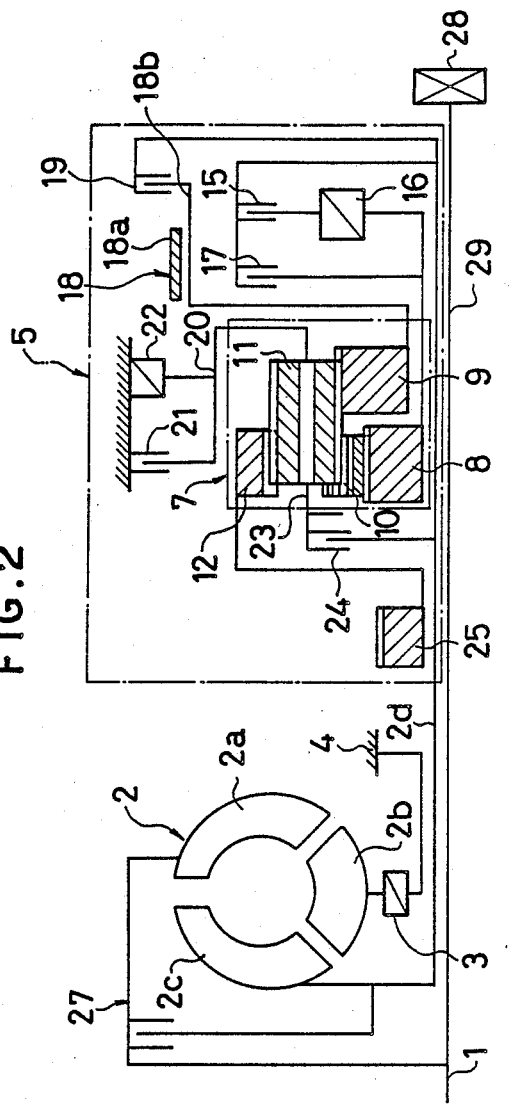

FIG. 3

HYDRAULIC CONTROL SYSTEM FOR AUTOMATIC TRANSMISSION

CROSS-REFERENCE TO THE RELATED APPLICATIONS

The present application relates to co-pending U.S. patent applications Ser. Nos. 32,611 filed on Mar. 31, 1987 entitled "CONTROL SYSTEMS FOR AUTOMATIC TRANSMISSIONS" and now U.S. Pat. No. 4,787,258, No. 31,612 filed on Mar. 30, 1987 entitled "CONTROL SYSTEMS FOR AUTOMATIC TRANSMISSIONS" and now U.S. Pat. No. 4,831,900 filed on Apr. 19, 1988 entitled "CONTROL OF AN AUTOMATIC VEHICLE POWER TRANSMISSION" and now allowed, No. 187,364 filed on Apr. 28, 1988 entitled "OIL PRESSURE CIRCUIT FOR AN AUTOMATIC TRANSMISSION" and now allowed which are assigned to the same assignee as the present application.

BACKGROUND OF THE INVENTION

1. Field of the invention

The present invention relates to a control system for an automatic transmission, more specifically to a hydraulic control for frictional elements incorporated into the automatic transmission when a gear shift operation is made therein.

2. Description of the prior art

An automatic transmission as conventionally incorporated into an automotive vehicle is provided with a plurality of frictional elements for performing a gear shift operation among a plurality of gear stages provided in the automatic transmission so that an optimum gear stage can be automatically established in accordance with a vehicle operating condition.

Such an automatic transmission is disclosed, for example, in U.S. Pat. No. 4,747,323 in which the frictional elements are controlled by a control unit wherein the frictional elements are actuated to be engaged or disengaged to thereby provide the optimum gear stage by means of a hydraulic pressure.

The U.S. Pat. No. 4,655,774 also discloses an automatic transmission utilizing the hydraulic pressure for controlling actions of the frictional elements for accomplishing the gear shift operation.

Each of the frictional elements is constituted by a piston actuated by the hydraulic pressure and a pair of engaging members to be brought into engagement with each other when the piston is moved by virtue of the hydraulic pressure to thereby establish an engaged condition.

However, there is a disadvantage in the conventional automatic transmission that a torque shock tends to be produced at an initial and final stage of the gear shift operation.

This torque shock in the gear shift operation is considered to be induced by a depression in a wheel rotation torque as a result of a fact that an increase of an engaging force produced in the pair of frictional members is not proportional to a displacement or stroke of the piston produced and/or an increase of the hydraulic pressure which is being applied to the piston for moving it to the engaged position.

SUMMARY OF THE INVENTION

It is therefore an object of the present invention to provide a hydraulic control system for an automatic transmission in which a torque shock can be eased or eliminated during a gear shift operation of plurality of gear stages in the transmission.

It is another object of the present invention to provide a control system for controlling a movement of frictional elements so as to eliminate a torque shock during the gear shift operation in the transmission.

It is still another object of the present invention to provide an automatic transmission in which a shift operation therein can be accomplished without a toque depression of wheels of a vehicle.

It is further object of the present invention to provide an automatic transmission in which a smooth and responsive gear shift operation can be obtained.

The above and other objects of the present invention can be accomplished by in a hydraulic control system for an automatic transmission comprising a multiple gear mechanism having a plurality of shift gear stages and frictional means provided with piston means and a pair of frictional members controlled to be moved between an engaged position in which the frictional members are frictionally engaged with each other and a disengaged position in which the frictional members are disengaged from each other by virtue of a hydraulic pressure applied to the piston so as to switch a power transmitting path in the automatic transmission for accomplishing a gear shift operation among the plurality of the shift gear stages, the improvement comprising a hydraulic supply means for applying the hydraulic pressure to the piston means, restricting means for restricting an increase of the hydraulic pressure applied to the piston means by a predetermined period at an initial stage of the gear shift operation wherein the frictional members are being moved to the engaged position and producing an initial engaging force therebetween.

According to the present invention, the increase of the hydraulic pressure applied to the piston means is restricted temporarily at a time when the frictional members are about to be brought into engagement with each other so that an abrupt increase in the engaging force between the frictional members can be prevented. As a result, the torque depression applied to the wheels can be effectively eased.

In a preferred embodiment, an increase of the hydraulic pressure applied to the piston means is restricted temporarily at a final stage of the gear shift operation wherein the frictional members are moved to the engaged position and being increased in the engaging force therebetween. Thus, an abrupt change in the engaging force during the gear shift operation can be avoided.

The above and other features of the present invention will be apparent from the following description taking reference to the accompanying drawings.

BRIEF DESCRIPTION OF THE DRAWINGS

FIG. 1 is a schematic view of a hydraulic control system in accordance with the present invention;

FIG. 2 is a sectional view showing an automatic transmission provided with torque converter and a hydraulic circuit to which the present invention can be applied;

FIG. 3 is a hydraulic control circuit in accordance with a preferred embodiment of the present invention;

nected with an output gear 25 arranged forward thereof. Numerals 29 and 28 denote a lock-up clutch for directly connecting the engine output shaft 1 with the converter output shaft 2d, and an oil pump driven by the engine output shaft 1 through an intermediate shaft 24 respectively.

The table 1 shows operations of the respective clutches and brakes in the respective shift gear stages of the transmission.

TABLE 1

| | | REVERSE CLUTCH 19 | COAST CLUTCH 17 | FORWARD CLUTCH 15 | 3-4 CLUTCH 24 | LOW & REVERSE BRAKE 21 | 2-4 BRAKE 18 | FIRST ONE-WAY CLUTCH 16 | SECOND ONE-WAY CLUTCH 22 |
|---|---|---|---|---|---|---|---|---|---|
| | P | | | | | | | | |
| | R | O | | | | O | | | |
| | N | | | | | | | | |
| D | 1st stage | | | O | | | | (O) | (O) |
| RANGE | 2nd stage | | O | O | | | O | (O) | |
| | 3rd stage | | O | O | O | | | (O) | |
| | O D | | | O | O | | O | (O) | |
| 2 | 1st stage | | | O | | | | (O) | (O) |
| RANGE | 2nd stage | | O | O | | | O | (O) | |
| | 3rd stage | | O | O | O | | | (O) | |
| 1 | 1st stage | | O | O | | O | | (O) | |
| RANGE | 2nd stage | | O | O | | | O | (O) | |

Figure 8:
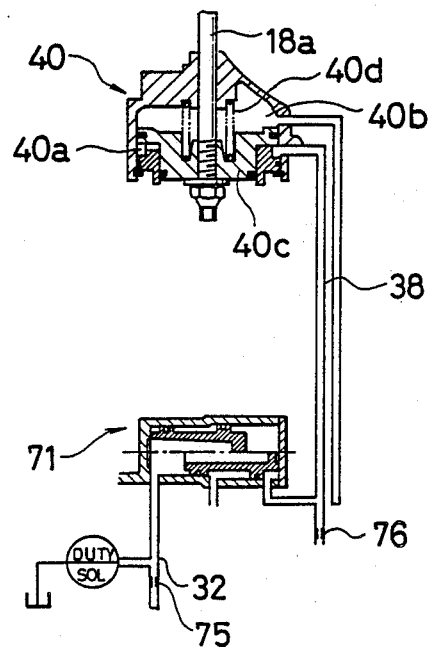

FIG. 8 is a hydraulic control circuit for the 2-4 brake in accordance still another embodiment of the present invention.

DESCRIPTION OF THE PREFERRED EMBODIMENT

Referring to the drawings, specifically to FIG. 1 and 2, an automatic transmission is provided with a torque converter 2 having a pump 2a connected with an engine output shaft 1, a stator 2b and a turbine 2c.

The stator 2b is mounted on a case 4 through a one-way clutch 3 which is provided for preventing the stator 2b from rotating in a direction opposite to that of the turbine 2c. The automatic transmission is also provided with a multiple transmission stage gear mechanism 5 having four stages for a forward direction and one stage for a reverse direction and connected with a converter output shaft 2d which is connected with the turbine 2c.

The gear mechanism 5 comprises Ravigneaux-type planetary gear mechanism 7 provided with a small sun gear 8 and a large sun gear 9 which are disposed side by side in a longitudinal direction of the transmission. The planetary gear mechanism 7 is also provided with a short pinion gear 10, a long pinon gear 11 meshed with the large sun gear 9 and the short pinion gear 10, and a ring gear 12 meshed with the long pinion gear 11. The small sun gear 8 is connected with the converter output shaft 2d through a forward clutch 15 located rearward of the sun gear 8 and a one-way clutch 16 connected with the forward clutch 15 for preventing a reverse rotation of the converter output shaft 2d, and a coast clutch 17 arranged in a row with the forward clutch 15 and the one-way clutch 16. The large sun gear 9 is connected with the converter output shaft 2d through a 2-4 brake 18 arranged rearward of the gear 9 and a reverse clutch 19 rearward of the brake 18. The long pinion 11 is connected with a low & reverse brake 21 for fixing the long pinion 11 and with a second one-way clutch 22 arranged in a row with the brake 21 for allowing a rotation of the long pinion 11 in the same direction as the engine output shaft 1 through a front carrier 20. A rear carrier 23 is connected with the converter shaft 2d through a 3-4 clutch 24. The ring gear 12 is con- In the table 1, reference O means that the corresponding element is under operation for transmitting a torque but the corresponding element to reference (O) is under racing operation.

As shown in the table 1, the 2-4 brake 18 is controlled to be engaged in shift positions or ranges D, 2, and 1 when a gear shift operation is made from a first gear stage to a second gear stage.

Hereinafter, there is described a hydraulic circuit for controlling the above frictional elements taking reference to FIG. 3.

In this description, a control for the 2-4 brake will be mainly explained as an example. It should however be noted that the present invention is not limited to the control concerning the 2-4 clutch but can be applied for controls for all other frictional elements employed to the transmission.

The hydraulic circuit in accordance with the present invention is provided with a pressure regulator 30 for adjusting a line pressure from the pump 28, a manual valve 31 connected with an oil line 32 having a line pressure adjusted by the pressure regulator 30. The manual valve 31 is provided with a spool 31a connected with a select lever and associated with the lever so that the spool 31a can be moved in accordance with a manual operation for the select lever by a driver to the range D in which the gear shift operation is automatically made among the four forward gear stages, range 2 in which the gear shift operation is automatically made among the first through a third gear stages of the transmission, the range 1 in which the gear shift operation is automatically made between the first and second gear stages and a reverse range R, a parking range P, a neutral range N. Thus, the manual valve 31 connects the oil line 32 with a oil supply line 33 when the select lever is in the ranges D, 2 and 1.

The supply line 33 is communicated with a 1-2 shift valve 37 which is communicated with an oil supply chamber 40a of a servo mechanism 40 incorporated into the 2-4 brake 18 through a line 38. When the gear stage of the transmission is set at a stage higher than the second gear stage, a 1-2 solenoid valve 39 is energized to move a spool 37a in the right direction in FIG. 3 to interrupt a communication between a chamber 37b and the line 38 so that the line 38 is communicated with the oil supply line 33. This causes a hydraulic pressure to be applied to the chamber 40a of the servo mechanism 40.

The line 33 is communicated with an oil release chamber 40b of the servo mechanism of the 2-4 brake 18 upstream of the 1-2 shift valve 37 through a release oil supply line 43 for supplying a hydraulic pressure for releasing the 2-4 brake 18. On the oil line 43 is disposed a servo pressure control valve 45 for controlling a hydraulic pressure to the oil release chamber 40b. The servo mechanism 40 is provided with a piston 40c connected with the 2-4 brake 18 through a rod 18a, the oil supply chamber 40a and the oil release chamber 40b which are divided by the piston 40c, and a spring 40d. The piston 40c is so constituted that a pressure area of the oil release chamber 40b is greater than that of the oil supply chamber 40a. Thus, even when a slight hydraulic pressure is applied on the supply chamber 40a, the piston can be moved downwardly in FIG. 3 to release the 2-4 brake 18. On the other hand, when the hydraulic pressure in the release chamber 40b is reduced beyond a predetermined value, the piston 40c is caused to be moved in the upward direction in FIG. 3 so that a drum 18a and band 18b as a pair of frictional members of the 2-4 brake 18 as a frictional element are brought into a frictional engagement with each other. This movement causes to switch a power transmitting path in the transmission so that a gear shift operation is completed to establish the second or the fourth gear stage.

Figure 3:
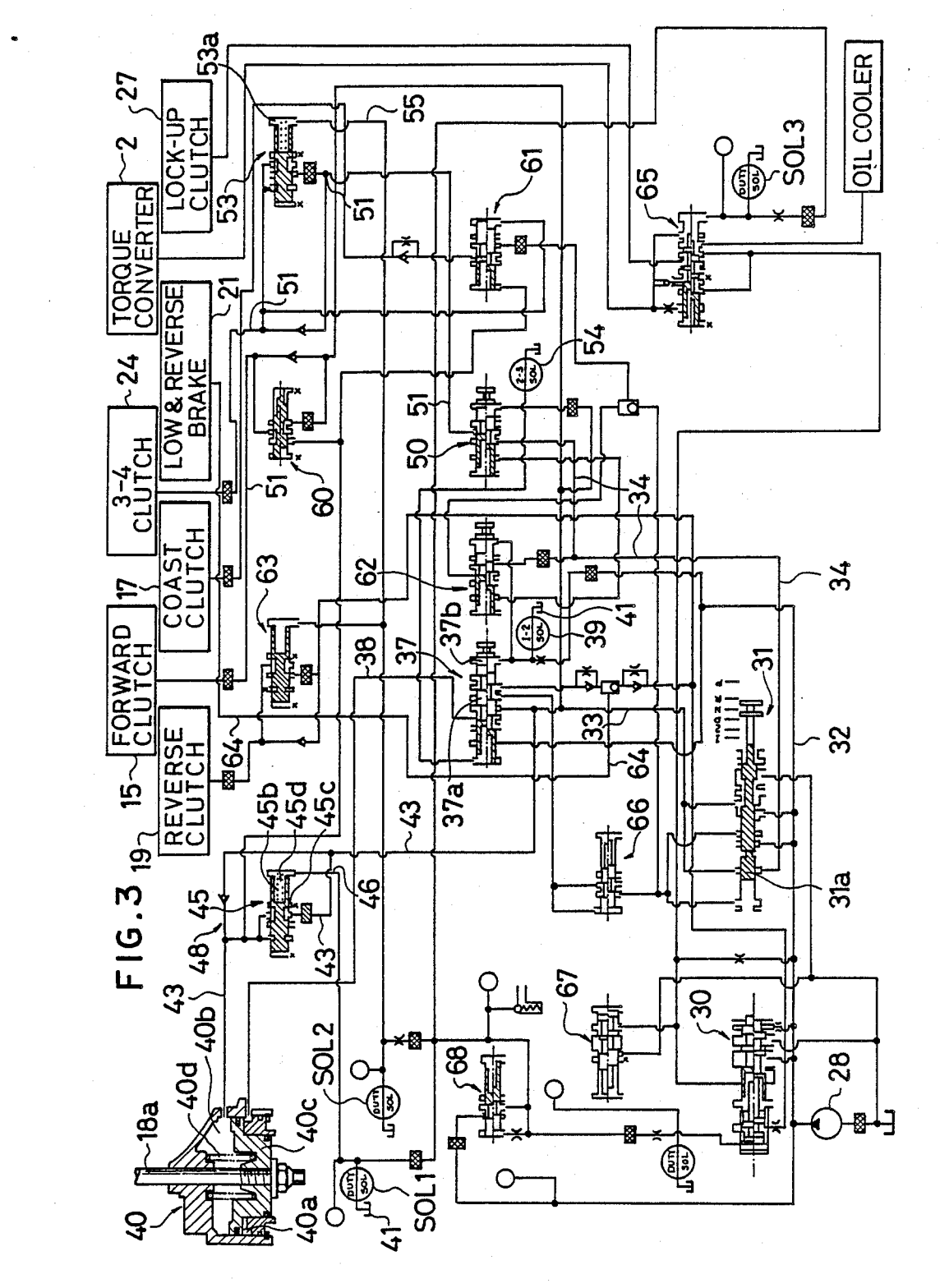

The servo pressure control valve 45 is provided with a spool 45a and a spring 45b for urging the spool 45a to a left direction in FIG. 3. An oil chamber defined by the spool 45a is communicated with the oil release line 43. There is provided a drain port 45c and a chamber 45d in which the spring 45b is disposed. The chamber 45d is communicated with a hydraulic adjusting line 46. With the line 46 is connected a first duty solenoid valve SOL1 between the servo pressure control valve 45 and a tank 41 for controlling the hydraulic pressure in the line 46 in accordance with a duty ratio applied thereto so that a movement of the spool 45a can be controlled in the right and left direction in accordance with a balance of forces applied thereto wherein a one of the forces which is a sum of the hydraulic pressure in the line 46 and a resilient force of the spring 45b is applied to a right side of the spool 45a and the other force which is a hydraulic pressure in the line 43 is applied to the left side of the spool 45a. In this manner, the drain port 45c is alternatively communicated with the line 43 at an upstream side of the valve 45. Eventually, the hydraulic pressure of the line 43, namely the hydraulic pressure in the release chamber 40b is controlled to be equalized to the sum of the hydraulic pressure of the line 46 and the resilient force of the spring 45a. Thus, a hydraulic pressure supply device 48 is constituted wherein a pressure difference between a hydraulic pressure adjusted by the valve 45 and applied to the release chamber 40b and a hydraulic pressure obtained through an operation of the 1-2 shift valve 37 and applied to the supply chamber is acted on the piston 40c for controlling the displacement thereof.

The hydraulic circuit is further provided with a 2-3 shift valve 50 disposed in an oil supply line 34 from the manual valve 31 and connected with a 3-4 clutch 24 through an oil supply line 51. In the line 51 is disposed a 3-4 clutch pressure control valve 53 for controlling a hydraulic pressure for the 3-4 clutch. The 2-3 shift valve 50 is controlled by an ON/OFF action of a 2-3 solenoid valve 54 in a manner that the valve 50 connects the line 34 as an upstream line with the line 51 as a downstream line in the OFF action of the solenoid valve 54 (third stage) to cause the 3-4 clutch 24 to be engaged. The 3-4 clutch pressure control valve 53 controls a hydraulic pressure in a hydraulic adjusting line 55 in accordance with a duty ratio for a second duty solenoid valve SOL2 which is connected with the line communicated with a chamber 53a of the control valve 53 to thereby control a hydraulic pressure in the line 51 which is applied to the 3-4 clutch 24 for actuating. There is provided a forward control valve 60 for providing the forward clutch 15 with a hydraulic pressure adjusted by the pressure control valve 45 when the manual valve 31 is switched from the range N to D so that a torque shock can be eased during the switching operation between N and D. The hydraulic circuit is provided with a coast control valve 61 for releasing the coast clutch 17 so as to prevent an internal lock of the planetary gear mechanism 7 in the forth stage in which the 3-4 clutch 24 and 2-4 brake are engaged. There is provided a coast exhaust valve 62 for controlling an operation of the coast clutch 17, specifically for forcibly releasing the clutch 17 in order to prevent the internal lock of the planetary mechanism 7 caused by a concurrent engagement of the 3-4 clutch 24 and the 2-4 brake 18 during a shift operation from the second to the third stages.

The hydraulic circuit is further provided with a reverse pressure control valve 63 for controlling an engaging pressure for the reverse clutch 19 by means of a hydraulic pressure control of the second duty solenoid valve SOL2 to ease a torque shock in a shift operation from the range N to D.

When a shift operation occurs to the range R in the manual valve 31, a hydraulic pressure is provided through a supply line 64. There are provided a lock-up control valve 65 for controlling an engaging force of the lock-up clutch 27 by a duty control for a third duty solenoid valve SOL3 and a low reducing valve 66 for maintaining an engaging force of the low & reverse brake 21 at a low value when the manual valve 31 is in the range 1.

There are also provided a converter relief valve 67 for controlling a hydraulic pressure in the converter 2 to a predetermined constant value and a reducing valve 68 for reducing a hydraulic pressure from the oil pump 28 for producing a line pressure by the pressure regulating valve 30.

Figure 4:
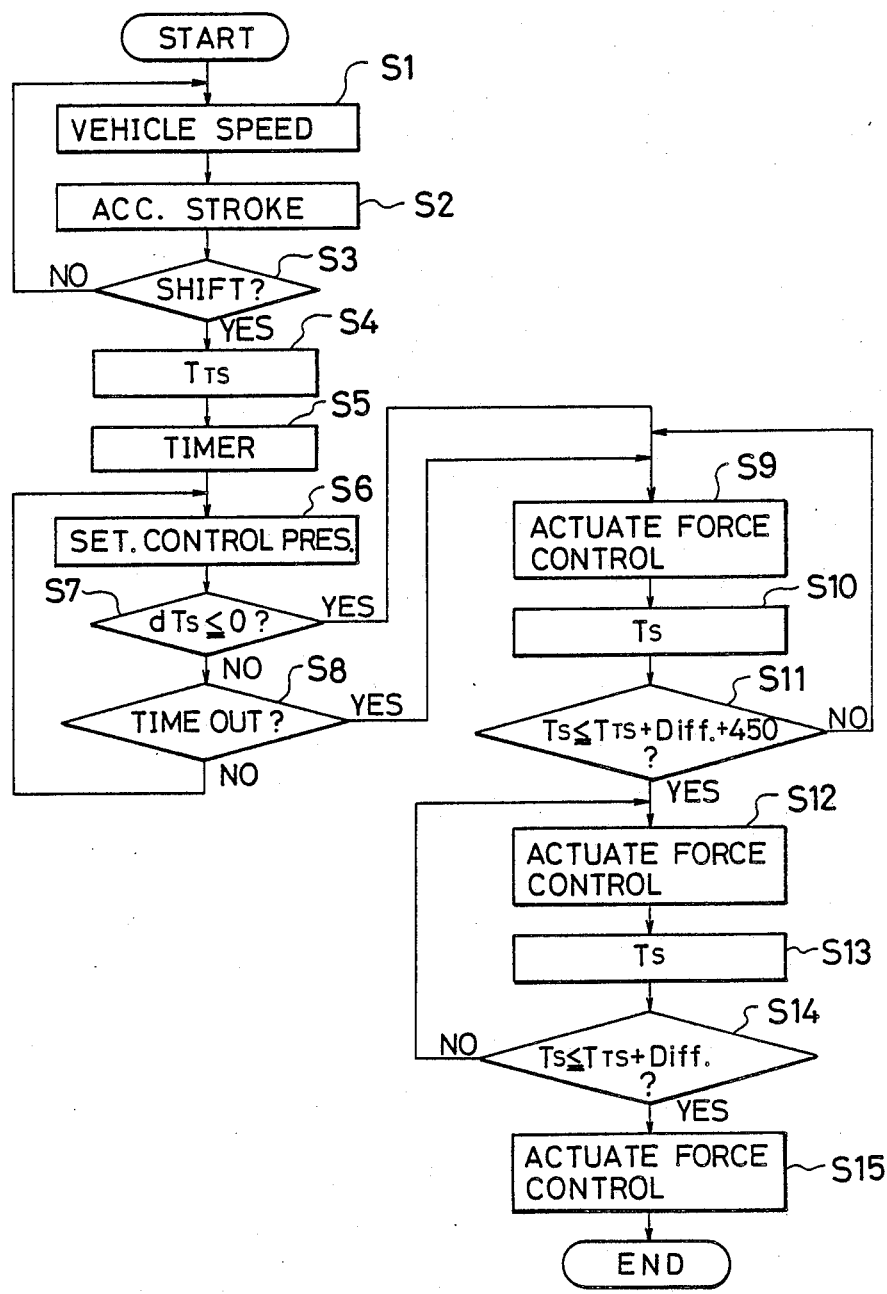
FIG. 4 is a flow chart of a hydraulic control specifically to 2-4 brake.

Hereinafter, a gear shift control will be explained taking reference to FIGS. 4, 5 and 6. This description will be exemplarily made with regard to a shift operation from the first stage to the second stage.

In order to carry out the shift control of the transmission, there is provided a control unit 70 for controlling the solenoid valves SOL1, SOL2 and SOL3 and the like which are adapted to control operations of the frictional elements. As shown in FIG. 4, the control unit 70 receives a vehicle speed signal (S1) and an acceleration pedal stroke signal (S2). Then the control unit judges whether or not the control unit 70 receives a gear shift signal for allowing the gear mechanism of the transmission to carry out a gear shift operation (S3).

Under a conventional shift control, a hydraulic pressure introduced into the supply chamber 40a is increased from an initial pressure which is set at a relatively low value to an intermediate pressure which is set at substantially a half value of the line pressure with a first pressure increase rate of a relatively small gradient in the course of the initial stage to the final stage of the shift operation. Thereafter, the hydraulic pressure for the supply chamber is abruptly increased to the line pressure with a second pressure increase rate of a relatively great gradient. In this conventional control, the first pressure increase rate is substantially fixed.

According to the study of the inventors of the present invention, it should however be noted that the above conventional control is disadvantageous in the following points. First of all, at an initial stage of the shift operation, the stroke or displacement of the piston 40c is increased when the piston 40c is not subjected to any force, and when the piston 40c is subjected to a resilient force of the spring 40d. However, during this operation, a hydraulic pressure for urging the piston 40 to cause an engagement of the 2-4 brake 18 does not reach an initial engaging pressure at which the drum 18a is brought into an initial engagement with the band. When the stroke of the piston 40c is further increased to cause the initial engagement of the drum 18a with the band, the hydraulic pressure is abruptly increased toward the initial pressure. The one-way clutch 22 is suddenly released in accordance with the abrupt change in the hydraulic pressure to cause a torque shock in the shift operation as shown in FIG. 5 by an arrow Y.

In addition, when the power transmitting path is about to be switched from the first stage to the second stage in the final stage of the shift operation, the gear mechanism 5 of the transmission is suddenly relieved from the drag force continuously acting on the transmission during the shift operation because the power transmitting path for the first stage is completely turned off. This causes an abrupt change in the torque acting on the wheels or another torque shock as shown by a broken line Z in FIG. 5.

In view of the above phenomenon, in the shift control of the present invention, the duty ratio of the first duty solenoid valve SOL1 is changed during the shift operation in accordance with the turbine speed and the like.

Figure 5:
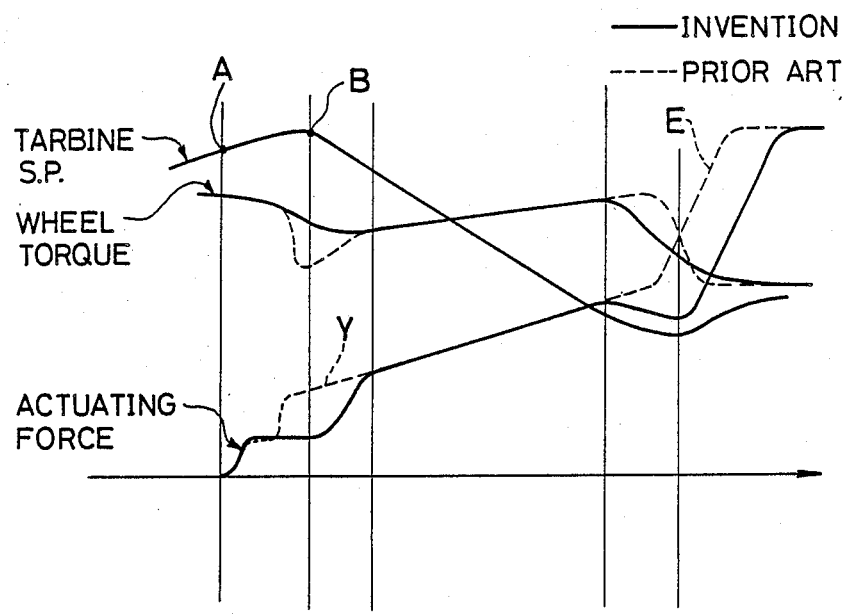
FIG. 5 is a graphical representation showing changes in wheels torque, turbine speed and actuating force during a shift operation.
Figure 6:
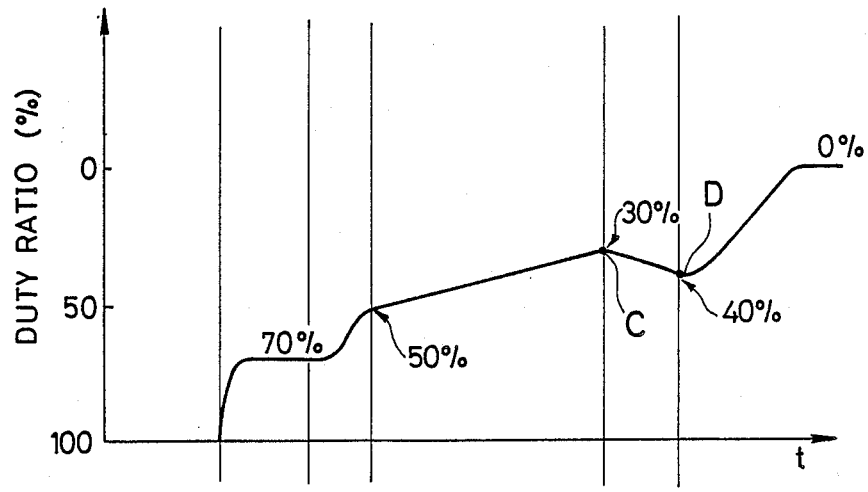
FIG. 6 is a graphical representation showing a change in a duty ratio for a solenoid valve for controlling a hydraulic pressure applied to the 2-4 brake.

For this purpose, in step 4, the control unit 70 calculates a target turbine speed Tts at the time when the shift operation is completed at a timing shown by a point A in FIG. 5. The target turbine speed Tts is provided by the equation: Tts=Ts*1.54(gear ratio of the second stage)/2.8(gear ratio of the first stage), wherein Ts is an actual turbine speed.

Then, the control unit 70 sets a timer for changing a value of the duty ratio for the first duty solenoid valve SOL1 after the timer expires (S5). The control unit 70 is conditioned to increase the actuating force to the piston 40 by changing the duty ratio for the first duty solenoid valve SOL1 to increase the stroke of the piston 40c for increasing the engaging force of the 2-4 brake 18. Thus, even when an amount of slippage in the 2-4 brake 18 is increased, the engaging force of the brake 18 can be prevented from an abrupt increase thereof.

In step 6, the control unit 70 determines an initial value of the duty ratio (70% in the illustrated embodiment) during the shift operation so that a predetermined value of the actuating force is produced for displacing the piston 40c. Thereafter, the control unit 70 judges whether or not the actual turbine speed Ts is reduced as a result of the engagement of the brake drum 18a and the brake band 18b (S7) at a timing of a point B in FIG. 5 in which it is judged whether or not a change in the actual turbine speed dTs=0. The control unit 70 further judges whether or not the timer is out (S8). If either the judgement in step S7 or S8 is Yes, the control unit 70 carries out step S9, that is, the control unit 70 changes the duty ratio for the first duty solenoid valve SOL1 (70% to 50% in this embodiment) relatively quickly to increase the actuating force of the piston 40c and increases the duty ratio with a substantially constant graduation (from 50% to 30% in this embodiment) (S9) as shown in FIG. 6 to gradually increase the actuating force of the piston 40c.

In step 10, the control unit 70 detects the turbine speed Ts. Thereafter, the control unit 70 judges whether or not the speed difference between the target turbine speed Tts and the actual turbine speed Ts is less than a predetermined value A (Diff. +450 rpm in this embodiment wherein Diff. is obtained by an equation; Diff.=dTs/2.8(gear ratio of the first stage)*α, (α is a constant)). If this judgment is Yes, the control unit 70 changes the duty ratio at a point C in FIG. 6 so as to increase gradually (from 30% to 40% in this embodiment as shown in FIG. 6) to keep the actuating force of the piston or slightly decrease it for restricting an abrupt reduction of the wheel torque by restraining an abrupt increase in the actuating force of the piston 40c. Then, the control unit 70 detects the turbine speed Ts again (S13) and judges whether or not the speed difference between the target turbine speed Tts and the actual turbine speed Ts is less than the value Diff. (S14). If this judgment is Yes, the duty ratio is controlled at a point D in FIG. 6 to be decreased toward 0% from 40% so that the 2-4 brake 18 is fully engaged. According to this control as explained in connection with steps 10 through 15, the final stage of the shift operation can be detected so that the actuating force of the piston 40c can be controlled to suppress the abrupt change in the torque, namely to prevent the torque shock based on the shift operation.

Figure 7:
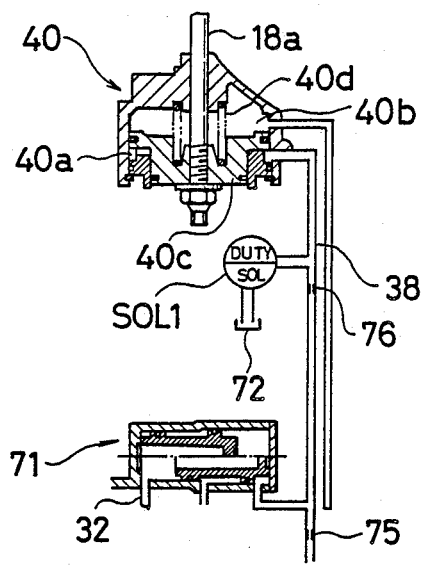
FIG. 7 is a hydraulic control circuit for the 2-4 brake in accordance another embodiment of the present invention.

Referring to FIG. 7, there is shown another embodiment of the present invention, the hydraulic circuit is provided with an accumulator 71 having a certain capacity in the supply line 38 for the supply chamber 40a. A hydraulic pressure is introduce into the line 38 when the second stage is supposed be established to actuate the piston stem 18a and engage the brake band. In this operation, the first duty solenoid valve SOLI restricts an increase of the hydraulic pressure introduced into the line 38. During the shift operation, there is no hydraulic pressure supply for the release chamber 40b. Orifices 75 and 76 are provided on the line 38 at positions upstream of the accumulator 71 and between the accumulator 71 and the first duty solenoid valve SOL1 respectively for controlling a hydraulic oil flow. The first duty solenoid valve SOL1 is provided between the accumulator 71 and the chamber 40a to control the hydraulic pressure of the supply chamber 40a rather than the chamber 40b unlike the former embodiment.

Referring to FIG. 8, still another embodiment of the present invention is shown. In this embodiment, the accumulator 71 is provided on the line 38 as well as the embodiment of FIG. 7. However, the first duty solenoid valve SOLI is provided on the line 32 in which a hydraulic pressure is applied for controlling a back pressure of the accumulator to thereby control the hydraulic pressure for the supply chamber 40a of the servo mechanism of the 2-4 brake 18. In this embodiment, the orifices 75 and 76 are provided on the lines 38 and 32 for controlling a hydraulic oil flow.

It will be apparent that various modifications and improvements may be made based on the above descriptions by those skilled in the art without departing from the scope of the claims as attached.

We claim:

1. A hydraulic control system for an automatic transmission comprising a multiple gear mechanism having a plurality of shift gear stages and at least one of frictional means provided with piston means and a pair of frictional members controlled to be moved between an engaged position in which the frictional members are frictionally engaged with each other and a disengaged position in which the frictional members are disengaged from each other by virtue of a hydraulic pressure applied to the piston means so as to switch a power transmitting path in the automatic transmission for accomplishing a gear shift operation among the plurality of the shift gear stages, the improvement comprising a hydraulic supply means for applying the hydraulic pressure to the piston means, restricting means for carrying out a restriction control in which the hydraulic pressure applied to the piston means is maintained at a substantially constant value for a predetermined period at an initial stage of the gear shift operation wherein the frictional members are being moved to the engaged position and producing an initial engaging force therebetween.

2. A hydraulic control system in accordance with claim 1 wherein the improvement further comprises torque converter means having pump means connected with engine output shaft means and turbine means connected with input shaft means of the transmission for transmitting a torque from the pump means to the turbine means through hydraulic fluid means, turbine speed detecting means for detecting a rotation speed of the turbine means, the hydraulic pressure applied to the frictional means being controlled in a manner that the restriction control is finished when a change in the rotation speed of the turbine means takes a negative value and that the hydraulic pressure is gradually increased to reach a predetermined value at which the hydraulic pressure is maintained for a predetermined period.

3. A hydraulic control system in accordance with claim 1 wherein the improvement further comprises timer means, the hydraulic pressure applied to the frictional means being controlled in a manner that the restriction control is finished when the timer means counts out a predetermined period and that the hydraulic pressure is gradually increased to reach a predetermined value at which the hydraulic pressure is maintained for a predetermined period.

4. A hydraulic control systems for an automatic transmission comprising a multiple gear mechanism having a plurality of shift gear stages and at least one of frictional means provided with piston means and a pair of frictional members controlled to be moved between an engaged position in which the frictional members are frictionally engaged with each other and a disengaged position in which the frictional members are disengaged from each other by virtue of a hydraulic pressure applied to the piston means so as to switch a power transmitting path in the automatic transmission for accomplishing a gear shift operation among the plurality of the shift gear stages, the improvement comprising a hydraulic supply means for applying the hydraulic pressure to the piston means, restricting means for carrying out a restriction control in which the hydraulic pressure applied to the piston means is maintained at a substantially constant value for a predetermined period at an initial stage of the gear shift operation wherein the frictional members are being moved to the engaged position and producing an initial engaging force therebetween, servo means provided with release chamber means and supply chamber means for controlling a hydraulic pressure for an operation of the frictional means, and solenoid means for controlling a hydraulic pressure introduced into the release chamber means by means of a duty ratio control so that a difference between a hydraulic pressure in the supply chamber means and the hydraulic pressure of the release chamber means is controlled to operate the frictional means.

5. A hydraulic control system for an automatic transmission comprising a multiple gear mechanism having a plurality of shift gear stages and at least one of frictional means provided with piston means and a pair of functional members controlled to be moved between an engaged position in which the frictional members are frictionally engaged with each other and a disengaged position in which the frictional members are disengaged from each other by virtue of a hydraulic pressure applied to the piston means so as to switch a power transmitting path in the automatic transmission for accomplishing a gear shift operation among the plurality of the shift gear stages, the improvement comprising a hydraulic supply means for applying the hydraulic pressure to the piston means, restricting means for carrying out a restriction control in which the hydraulic pressure applied to the piston means is maintained at a substantially constant value for a predetermined period at an initial stage of the gear shift operation wherein the frictional members are being moved to the engaged position and producing an initial engaging force therebetween, accumulator means for supplying a hydraulic pressure for the hydraulic supply means and solenoid means provided between the accumulator and the frictional means for controlling the hydraulic pressure provided by the accumulator means and applied to the piston means to thereby carry out the restriction control.

6. A hydraulic control system for an automatic transmission comprising a multiple gear mechanism having a plurality of shift gear stages and at least one of frictional means provided with piston means and a pair of frictional members controlled to be moved between an engaged position in which the frictional members are frictionally engaged with each other and a disengaged position in which the frictional members are disengaged from each other by virtue of a hydraulic pressure applied to the piston means so as to switch a power transmitting path in the automatic transmission for accomplishing a gear shift operation among the plurality of the shift gear stages, the improvement comprising a hydraulic supply means for applying the hydraulic pressure to the piston means, restricting means for carrying out a restriction control in which the hydraulic pressure applied to the piston means is maintained at a substantially constant value for a predetermined period at an initial stage of the gear shift operation wherein the frictional members are being moved to the engaged position and producing an initial engaging force therebetween, accumulator means for supplying a hydraulic pressure of the hydraulic supply means and solenoid means provided upstream of the accumulator means for controlling a back pressure of the accumulator means to thereby control the hydraulic pressure applied to the piston means.

7. A hydraulic control system for an automatic transmission comprising a multiple gear mechanism having a plurality of shift gear stages and at least one of frictional means provided with piston means and a pair of frictional members controlled to be moved between an engaged position in which the frictional members are frictionally engaged with each other and a disengaged position in which the frictional members are disengaged from each other by virtue of a hydraulic pressure applied to the piston means so as to switch a power transmitting path in the automatic transmission for accomplishing a gear shift operation among the plurality of the shift gear stages, the improvement comprising a hydraulic supply means for applying the hydraulic pressure to the piston means, restricting means for carrying out a restriction control in which an increase of the hydraulic pressure applied to the piston means is restricted by a predetermined period at a final stage of the gear shift operation wherein the frictional members are moved to the engaged position and being increased in the engaging force therebetween.

8. A hydraulic control system in accordance with claim 7 wherein the improvement further comprises torque converter means having pump means connected with engine output shaft means and turbine means connected with input shaft means of the transmission for transmitting a torque from the pump means to the turbine means through hydraulic fluid means, turbine speed detecting means for detecting an actual speed of the turbine means, turbine speed speculating means for speculating a target speed of the turbine means at a time when the shift operation is completed, the restriction control being initiated when a difference between the target speed and the actual speed of the turbine means is reduced below a predetermined value.

9. A hydraulic control system in accordance with claim 8 wherein the restriction control is finished when the target speed of the turbine means is substantially the same as the actual speed, thereafter, the hydraulic pressure applied to the piston means being relatively abruptly increased.

10. A hydraulic control system in accordance with claim 7 wherein the improvement further comprises servo means provided with release chamber means and supply chamber means for controlling a hydraulic pressure for an operation of the frictional means, and solenoid means for controlling a hydraulic pressure introduced into the release chamber means by means of a duty ratio control so that a difference between a hydraulic pressure in the supply chamber means and the hydraulic pressure of the release chamber means is controlled to operate the frictional means.

11. A hydraulic control system in accordance with claim 7 wherein the improvement comprises accumulator means for supplying a hydraulic pressure for the hydraulic supply means and solenoid means provided between the accumulator and the frictional means for controlling the hydraulic pressure provided by the accumulator means and applied to the piston means to thereby carry out the restriction control.

12. A hydraulic control system in accordance with claim 7 wherein the improvement comprises accumulator means for supplying a hydraulic pressure of the hydraulic supply means and solenoid means provided upstream of the accumulator means for controlling a back pressure of the accumulator means to thereby control the hydraulic pressure applied to the piston means.

13. A hydraulic control system for an automatic transmission comprising a multiple gear mechanism having a plurality of shift gear stages and at least one of frictional means provided with piston means and a pair of frictional members controlled to be moved between an engaged position in which the frictional members are frictionally engaged with each other and a disengaged position in which the frictional members are disengaged from each other by virtue of a hydraulic pressure applied to the piston means so as to switch a power transmitting path in the automatic transmission for accomplishing a gear shift operation among the plurality of the shift gear stages, the improvement comprising a hydraulic supply means for applying the hydraulic pressure to the piston means, restricting means for carrying out a restriction control in which an increase of the hydraulic pressure applied to the piston means is restricted by a predetermined period at an initial stage of the gear shift operation wherein the frictional members are being moved to the engaged position and producing an initial engaging force therebetween and at a final stage of the gear shift operation wherein the frictional members are moved to the engaged position and being increased in the engaging force therebetween.

14. A hydraulic control system in accordance with claim 13 wherein the improvement further comprises servo means provided with release chamber means and supply chamber means for controlling a hydraulic pressure for an operation of the frictional means, and solenoid means for controlling a hydraulic pressure introduced into the release chamber means by means of a duty ratio control so that a difference between a hydraulic pressure in the supply chamber means and the hydraulic pressure of the release chamber means is controlled to operate the frictional means.

15. A hydraulic control system in accordance with claim 4 wherein the hydraulic pressure in the release chamber is reduced by means of a duty ratio control to engage the frictional means.

* * * * *